(12) United States Patent
Häring

(10) Patent No.: US 10,556,996 B2
(45) Date of Patent: Feb. 11, 2020

(54) METHOD FOR PREPARING A SOLUTION OF A SULFONATED POLYMER AND AN AMINO-PHOSPHONIC ACID IN AN APROTIC SOLVENT

(71) Applicant: Between Lizenz GMBH, Stuttgart (DE)

(72) Inventor: Thomas Häring, Stuttgart (DE)

( * ) Notice: Subject to any disclaimer, the term of this patent is extended or adjusted under 35 U.S.C. 154(b) by 579 days.

(21) Appl. No.: 14/703,787

(22) Filed: May 4, 2015

(65) Prior Publication Data

US 2015/0232624 A1 Aug. 20, 2015

Related U.S. Application Data

(63) Continuation of application No. 12/161,932, filed as application No. PCT/DE2007/000133 on Jan. 23, 2007, now Pat. No. 9,023,557.

(30) Foreign Application Priority Data

Jan. 23, 2006 (DE) .................. 10 2006 003 316

(51) Int. Cl.
*C08J 3/11* (2006.01)
*H04B 7/14* (2006.01)
(Continued)

(52) U.S. Cl.
CPC .............. *C08J 3/11* (2013.01); *C08J 5/2256* (2013.01); *H01M 8/1048* (2013.01); *H01M 8/1072* (2013.01); *H01M 8/1081* (2013.01); *H04B 7/14* (2013.01); *H04B 7/155* (2013.01); *H04B 7/2606* (2013.01); *H04W 24/10* (2013.01); *H04W 72/0406* (2013.01); *C08J 2371/00* (2013.01); *H01M 2300/0082* (2013.01); *H04W 28/04* (2013.01); *H04W 48/08* (2013.01);
(Continued)

(58) Field of Classification Search
CPC ........ C08J 3/11; C08J 5/2256; C08J 2371/00; H01M 8/1072; H01M 8/1048; H01M 8/1081; H01M 2300/008
USPC ........................................ 429/493
See application file for complete search history.

(56) References Cited

U.S. PATENT DOCUMENTS 5,906,716 A * 5/1999 Mertesdorf ............... C25B 9/10
204/252
6,495,209 B1 12/2002 Cisar
(Continued)

FOREIGN PATENT DOCUMENTS

EP 0688824 A2 12/1995
JP 2003020308 A 1/2003
(Continued)

OTHER PUBLICATIONS

Hickner et al. "Alternative Polymer Systems for Proton Exchange Membranes (PEMs)", Chemical Reviews 2004, vol. 104 No. 10, published on Oct. 13, 2004.*
(Continued)

*Primary Examiner* — Gary D Harris
(74) *Attorney, Agent, or Firm* — Edward C. Kwok; VLP Law Group, LLP

(57) ABSTRACT

A method is disclosed for production of solutions of amino-phosphonic acids and polymeric sulfonic acids in aprotic solvents. Membranes for membrane methodologies are produced from said solutions. Said membranes can also be doped with phosphoric acid.

12 Claims, 3 Drawing Sheets condensation of phosphonic acids.

(51) Int. Cl.
*H04W 72/04* (2009.01)
*H04B 7/155* (2006.01)
*H04B 7/26* (2006.01)
*H04W 24/10* (2009.01)
*C08J 5/22* (2006.01)
*H01M 8/1048* (2016.01)
*H01M 8/1072* (2016.01)
*H01M 8/1081* (2016.01)
*H04W 84/04* (2009.01)
*H04W 48/08* (2009.01)
*H04W 88/04* (2009.01)
*H04W 28/04* (2009.01)
*H04W 72/12* (2009.01)

(52) U.S. Cl.
CPC ........ *H04W 72/04* (2013.01); *H04W 72/0446* (2013.01); *H04W 72/1242* (2013.01); *H04W 84/042* (2013.01); *H04W 84/047* (2013.01); *H04W 88/04* (2013.01)

(56) References Cited

U.S. PATENT DOCUMENTS

| | | | |
|---|---|---|---|
| 7,534,515 | B2 | 5/2009 | Nam et al. |
| 2001/0038937 | A1 | 11/2001 | Suzuki et al. |
| 2005/0053818 | A1 | 3/2005 | St-Arnaud et al. |
| 2005/0084727 | A1 | 4/2005 | Kiefer et al. |
| 2006/0008690 | A1 | 1/2006 | Uensal et al. |
| 2006/0257705 | A1 | 11/2006 | Nakato et al. |
| 2007/0055045 | A1 | 3/2007 | Kiefer et al. |
| 2009/0214921 | A1 | 8/2009 | Uensal et al. |

FOREIGN PATENT DOCUMENTS

| | | |
|---|---|---|
| JP | 2005203316 A | 7/2005 |
| WO | 0027513 A2 | 5/2000 |
| WO | 03067691 A2 | 8/2003 |

OTHER PUBLICATIONS

Written Opinion for PCT/DE2007/000133, with English translation.
International Search Report, dated Jul. 26, 2007, for WO 2007/082526.
Hasiotis, C. et al., "New polymer electrolytes based on blends of sulfonated polysulfones with polybenzimidazole" Electrochimica Acta, vol. 46, Issue 15, Apr. 30, 2001, pp. 2401-2406; (Abstract).
Kallitsis, J. et al., "Proton Conducting Membranes Based on Polymer Blends for Use in High Temperature PEM Fuel Cells" Journal of New Materials for Electrochemical Systems, vol. 6, 2003, pp. 217-222.
"Coupling Agent T3P—The Water Scavenger" by Clariant.
Machine translation for Kamiya et al., JP 2003-020308 A.
Machine translation for Kawa et al., JP 2005203316 A.

\* cited by examiner

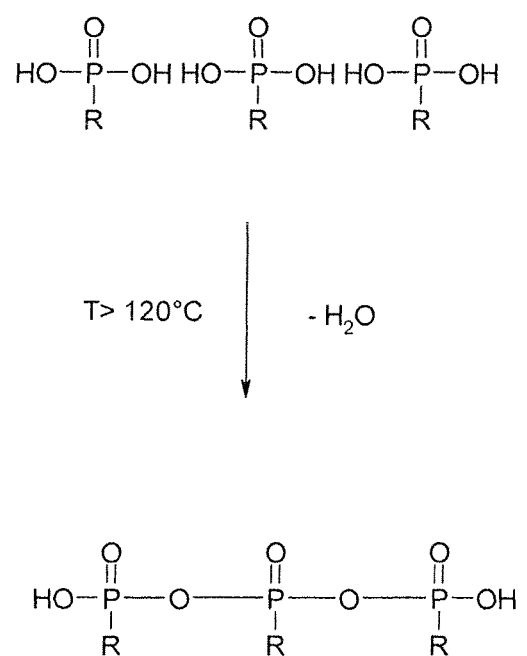
Figure 1: condensation of phosphonic acids.

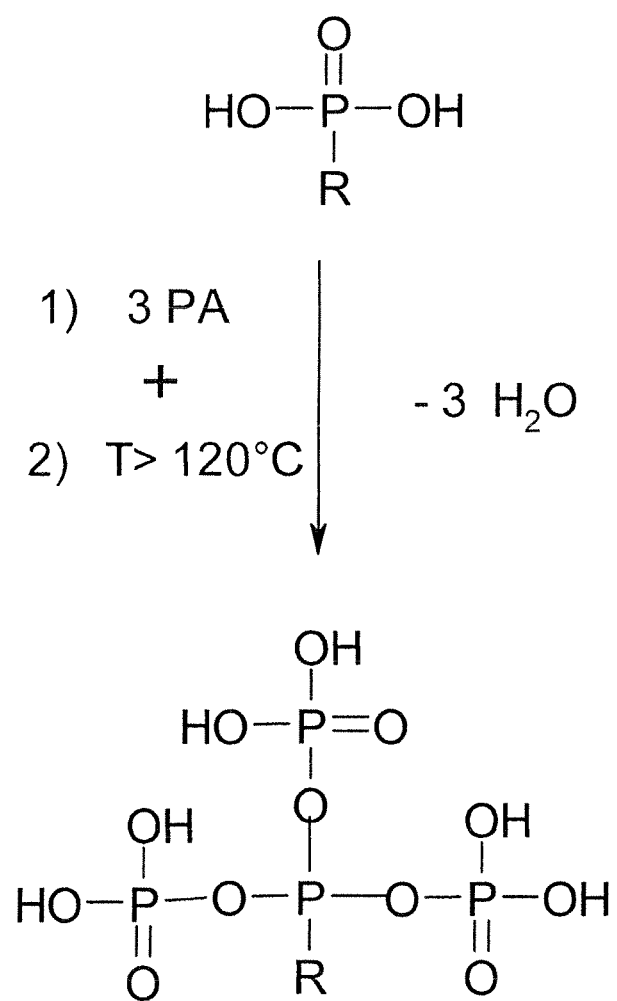
Figure 2: Mixed condensation of phosphonic acids with PA (general scheme)

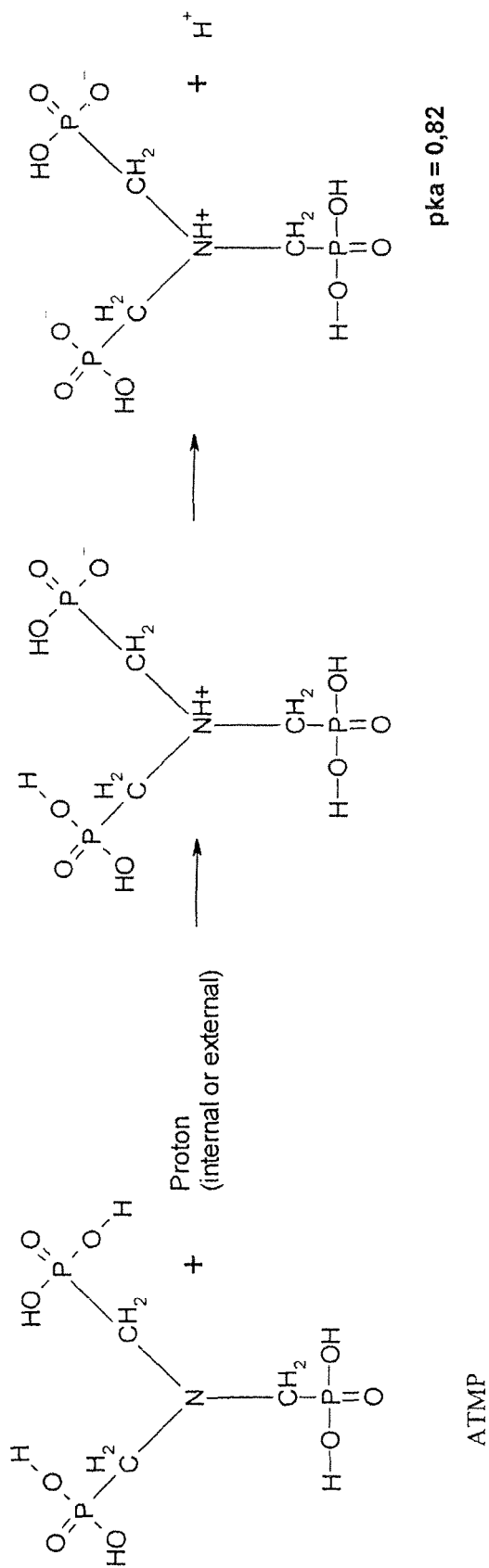
Figure 3: Interaction for increased acidity of ATMP here represented by internal protonation and the $pk_A$-value of deprotonation of the second phosphonic acid group.

METHOD FOR PREPARING A SOLUTION OF A SULFONATED POLYMER AND AN AMINO-PHOSPHONIC ACID IN AN APROTIC SOLVENT

CROSS-REFERENCE TO RELATED APPLICATIONS

The present application is a continuation application claiming priority of U.S. application Ser. No. 12/161,932, filed on Jul. 23, 2008, which is a national phase filing claiming priority of PCT International Application, serial no. PCT/DE07/00133, filed on Jan. 23, 2007, which claims priority of German Application, serial no. 102006003316.7, filed on Jan. 23, 2006.

STATE-OF-THE-ART

Membranes from non-water-soluble sulfonated polymers that additionally contain low molecular phosphonic acids can not be manufactured by known post treatment methods of the sulfonated membrane.

The invention relates to a process to manufacture an electrolyte that solves this and other problems.

BRIEF DESCRIPTION OF THE DRAWINGS

FIG. 1 illustrates condensation of phosphonic acids.

FIG. 2 depicts mixed condensation of phosphonic acids with phorphoric acid (PA), in accordance with one embodiment of the present invention.

FIG. 3 depicts interaction for increased acidity of amino-tris-methylene-phosphonic acid (ATMP), in accordance with one embodiment of the present invention.

DESCRIPTION

Low molecular phosphonic acids are not or only very poorly dissolved in organic solvents. This is especially the case for the aprotic solvents e.g., N-methyl-2-pyrrolidone (NMP), dimethyl sulfoxide (DMSO), dimethyl formamide (DMF) and dimethyl acetamide (DMAc).

Sulfonated polymers as sulfonated polysulphone or sulfonated polyetherketone are used as membranes in technology.

It would be desirable to blend these polymers with low molecular phosphonic acids. Thereby it is discovered that the phosphonic acids are not or only very poorly dissolved in organic solvents. This is especially the case for amino-phosphonic acids. Experiments where membranes made of sulfonated polyetherketone were posttreated in the aqueous solution of these phosphonic acid revealed that the phosphonic acids penetrate the membrane only very marginally. This also does not change by increasing the temperature or the concentration of the aqueous phosphonic acid solution. Membranes are used whose ion exchange capacity is below the solubility in water. The limit of the solubility in water is depending on the used polymer approximately at 2.0 meq/gr. The limit of the solubility in water is at 2.4 meq/gr for polymers with a fluorinated or partially fluorinated backbone. Sulfonated PEEK does already start to dissolve at IEC of 1.8-1.85 in heated water. Hereinafter a process is presented that makes it possible to mix low molecular phosphonic acids with polymeric sulfonic acids in organic solvents and it is presented how particles, membranes, shapes and coatings can be manufactured.

This completely surprising and novel and new effect has been discovered.

Aminotrismethylene-phosphonic acid is a low molecular aminophosphonic acid and not or only very marginally soluble in organic solvents especially in aprotic solvents as sulfolane, NMP, DMAc, DMF and DMSO. But this changes if a sulfonated polymer is dissolved in one of the aprotic solvents and the corresponding aminophosphonic acid is added. At the beginning the phosphonic acid is insoluble and dissolves slowly in the solution of the already dissolved polymer. The dissolution probably occurs because of an acid-base-interaction between the basic nitrogen and the sulfonic acid group. As the acidity of the sulfonic acid is higher than that of the phosphonic acid the aminophosphonic acid is dissolved in the acidic polymer. It is the immobilisation of a low molecular base that has an additional functional group, in this case the phosphonic acid. Every compound that is capable to form an ionic interaction with the sulfonic acid group of the polymer can be used as a base. The preferred solvent is DMSO. It was found out surprisingly that the calculated equivalent amounts of the aminophosphonic acids do not dissolve in a solution of sulfonated polyetherketone in NMP. This is especially the case for aminophosphonic acids that contain more than one NCP-group. One example therefore is diethylene-trisamino-pentamethylene-phosphonic acid (DTPMP). Theoretically to each molecule sulfonic acid on the polymer-chain maximum one molecule DTPMP can be added. But this does not function in NMP. In DMSO it is possible. The reason therefore is probably that NMP itself is a basic molecule. The amino group competes with the NMP (N-methylpyrolidone) for the sulfonic acid groups.

One sulfonic acid group on the polymer chain can immobilise one low molecular basic molecule via the acid-base-interaction. Is this exceeded then the excess in the residual solvent is not soluble any more.

It does not make any difference in which order the components solvent, polymeric sulfonic acid and aminophosphonic acid are mixed. In any case the sulfonic acid dissolves first and then dissolves the normally insoluble aminophosphonic acid via acid-base-interaction.

The basic molecule is described by the general formula $R_2N-CR_2PO_3H_2$, whereby R is independently from another an alkyl-, aryl-, heteroaryl-, a carbon atom substituted at will or hydrogen. The substitution pattern has only the restriction that is does not cleave the acid-base-interaction between the nitrogen and the sulfonic acid. In the case of ATMP (aminotrismethylene-phosphonic acid) both moieties R at the nitrogen are identical and R is $-CH_2-PO_3H_2$ and R at the carbon is hydrogen. When the nitrogen is protonated, $R_2NH^+-CH_2-PO_3H_2$ is obtained and the acidity of the phosphonic acid moiety is strongly increased. This results in higher proton conductivity.

Preferred are also compounds with the general formula $R_2N-CR-(PO_3H_2)_2$ whereby R is again as defined above. One example for this class of compounds of bisphosphonic acids is dimethyleneamino-methylene-bisphosphonic acid (MAMDP) $(Me_2N)CH(PO_3H_2)_2$ and aminoethylene-bisphosphonic acid $(MeC(NH_2)(PO_3H_2)_2)$, whereby Me is $CH_3$.

In favour are also compounds whose group $R_2N-CR-$ of the general formula $R_2N-CR_2-PO_3H_2$ was closed to a heterocycle, e.g. pyridine, imidazole, triazole or which is part of a heterocyclic system. The order of the atoms NCP is determining the increase of acidity of the phosphonic acid.

These are examples for aminophosphonic acids which were used: aminotrismethylene-phosponic acid, diethylenetriamino-pentamethylene-phosphonic acid, ethylenediamino-tetramethylene-phosphonic acid and pentaethylene-hexamine-octakis-methylenephosphonic acid. This enumeration is not restricting and can be added at will by the person skilled in the art.

The aminophosphonic acids are dissolved in the solutions of the sulfonated polymers. All polymers that dissolve in the described aprotic solvents can be used as sulfonated polymer. The preferable IEC of the sulfonated polymers is between 0.5 and 5 milliequivalent per gram.

Example 1

Sulfonated polyetherketone with an IEC of 1.8 milliequivalent is dissolved in DMSO. 50 gram of a 10% by weight solution is used. The solution contains 5 gram sulfonated polymer. Equivalent to the sulfonic acid group the aminophosphonic acid diethylenetriamino-pentamethylene-phosphonic acid (DTPMP) is added to the solution. Maximum almost 5 gram can be added. In the above described example 3 gram are added. Now the aminophosphonic acid dissolves.

The solution is casted as a thin film on a glass plate. The thickness of the film is approximately 600µ. The solvent is evaporated at a temperature of approximately 100° C. in the drying oven. This is an established process to manufacture membranes. After the solvent has been completely removed the film is carefully detached from the glass plate. This is easier when the plate is still warm or the foil is carefully humidified with a squirt bottle. It is then easier to detach it from the plate.

The obtained foil is then soaked in 80% phosphoric acid and left in the oven at 60° C.

Thereby the foil incorporates phosphoric acid.

After the post treatment with phosphoric acid (PA) the membrane has proton conductivity as well at temperatures at about 20° C. as also at higher temperatures.

Example 2

Sulfonated polyetheretherketone with an IEC of 1.3 milliequivalent is dissolved in heated DMSO. 50 gram of a 10% by weight solution is used. The solution contains 5 gram sulfonated polymer. To this solution the aminophosphonic acid diethylene-triamino-pentamethylen-phosphonic acid (DTPMP) is added equivalently to the sulfonic acid group. Maximum almost 2 gram can be added, in this example 1.5 gram are added. Now the aminophosphonic acid dissolves.

Example 3

Sulfonated polyetherketone (SPEK) with an IEC of 1.8 milliequivalent is dissolved in DMSO. A 15% by weight solution is used. To this solution the aminophosphonic acid diethylene-triamino-pentamethylen-phosphonic acid (DTPMP) is added equivalently to the sulfonic acid group. The solution is casted as a thin film on a glass plate. The thickness of the film is approximately 600µ. The solvent is evaporated at a temperature of approximately 100° C. in the drying oven. This is an established process to manufacture membranes. After the solvent has been completely removed the film is carefully detached from the glass plate. This is easier when the plate is still warm or the membrane is carefully humidified with a squirt bottle. Then it is easier to detach the foil from the plate.

The obtained foil is then soaked in 80% phosphoric acid and left in the oven at 60° C. Thereby the foil incorporates phosphoric acid.

After the post treatment with phosphoric acid (PA) the membrane has a proton conductivity as well at temperatures at about 20° C. as also at higher temperatures. The membrane is hygroscopic and absorbs eagerly water from the ambient air. The proton conductivity is based on the one side on the waterbased conduction mechanism and at anhydrous state it is based on the corporated phosphoric acid. When the membrane contains 1 gram SPEK and 1.03 gram DTPMP then the aminophosphonic acid is bound to the sulfonated polymer with exactly one nitrogen atom. Now the two remaining nitrogen atoms attach each a molecule phosphoric acid (PA). This results in the following ion exchange capacity: SPEK=1.8 and SPEK+DTPMP=9.75 and SPEK+DTPMP+PA=12.83. This means that the IEC of the starting polymer is strongly increased and thus also the proton conductivity.

Sulfonated polymers with immobilised amino phosphonic acids suit very well as electrolyte in the direct methanol fuel cell. The methanol cross over of such a membrane is clearly lower in comparison with the pure sulfonated polymers. The aminophosphonic acids that have more than one basic centre are hereby especially preferred. Examples for this is DTPMP and pentaethylenehexamine-octakis-methylene-phosphonic acid. If these phosphonic acids are used, a ratio of 1:2 with regard to the phosphonic acid molecule to the sulfonic acid groups is preferred. That means that one aminophosphonic acid forms an ionic bound to two sulfonic acids. Thus a cross linking results that improves the mechanical properties of the membrane. Hereby the IEC does not increase as strongly as at a ratio of 1:1 but still sufficient to obtain a clear increase of the proton conductivity. A cross linking is of course not possible if ATMP is used because this molecule has only one nitrogen atom.

1) Immobilisation of ATMP in a PBI Membrane:

A foil of PBI (10 x10 cm$^2$) with a thickness of 60µ is soaked in a 50% by weight solution of ATMP in water. The solution is left for 24 h at 80° C. in the oven. Then the membrane is removed and the surface is dried with pulp.

2) Immobilisation of PA in a PBI Membrane:

A membrane of PBI (10 x10 cm$^2$) with a thickness of 60µ is soaked in a 50% weight solution of PA in water. This solution is left for 24 h at 80° C. in the oven. The foil is dried as in example 1.

3) Immobilisation of PA and ATMP in a PBI Membrane:

A membrane of PBI (10 x10 cm$^2$) with a thickness of 60µ is soaked in an aqueous solution of ATMP and PA. The solution contains 25% weight ATMP and 25% weight PA. The solution is left for 24 h at 80° C. in the oven. The membrane is dried as in example 1.

4) Immobilisation of PA and ATMP in a PBI Membrane:

A membrane of PBI (10 x10 cm$^2$) with a thickness of 60µ is soaked in an aqueous solution of ATMP and PA. The solution contains 25% weight ATMP and 25% weight PA. The solution is left for 24 h at 80° C. in the oven. The membrane is dried at 130° C. and then again soaked in the solution of ATMP and PA.

I claim:

1. A method for preparing a solution of sulfonated polymer and a phosphonic acid, comprising:
    dissolving the sulfonated polymer in an aprotic solvent; and
    adding the phosphonic acid into the solution, wherein the phosphonic acid comprises a basic phosphonic acid that accepts a proton.

2. The method according to claim 1, wherein the aprotic solvent is selected from the group consisting of N-methyl- 2-pyrrolidone (NMP), dimethyl acetamide (DMAc), sulfolane, dimethyl formamide (DMF) and dimethyl sulfoxide (DMSO).

3. A method according to claim 1, wherein the basic phosphonic acid comprises a low molecular weight amino phosphonic acid selected from the group consisting of:

(a) a phosphonic acid with the general formula $R_2N$—$CR_2$—$PO_3H_2$;

(b) a phosphonic acid with the general formula $R_2N$—$CR$—$(PO_3H_2)_2$; and (c) a phosphonic acid with the general formula $R_2N$—$CR$—$(PO_3H_2)_2$, in which the group RN—CR— represents a heterocycle;

wherein R is selected from the group consisting of an alkyl, aryl, heteroaryl, arbitrarily substituted carbon atom and hydrogen.

4. A method according to claim 3, wherein the hyterocycle comprises pyridine, imidazole, or triazole.

5. The method according to claim 1, wherein the basic phosphonic acid is selected from the group consisting of aminotrismethylene phosphonic acid, diethylenetriamine penta(methylene phosphonic acid), ethylendiaminotetra(methylene phosphonic acid), Pentaethylenehexamine-octakis-(methylene phosphonic acid), Dimethylamino-(methylene diphosphonic acid) (MAMDP) and Aminoethylen (diphosphonic acid) (AEDP).

6. A method for preparing a solution of sulfonated polymer and a phosphonic acid, comprising:

dissolving the sulfonated polymer in an aprotic solvent; and adding the phosphonic acid into the solution, wherein the sulfonated polymer has an ion exchange capacity (IEC) between 0.5 and 5 milliequivalents per gram, preferably between 0.8 and 2 milliequivalents per gram.

7. A method for preparing a solution of sulfonated polymer and a phosphonic acid, comprising:

dissolving the sulfonated polymer in an aprotic solvent; and adding the phosphonic acid into the solution, wherein the method is used in conjunction with production of membranes, particles, coatings or moldings.

8. An article of manufacture formed according to the method of claim 7, wherein the article of manufacture comprises a membrane, a particle, a coating or a molding.

9. A method according to claim 7, further comprising:

knife-coating the solution on a glass plate to form a thin film; and evaporating the aprotic solvent from the solution at a temperature of about 100° C.; and forming a membrane by subsequently removal from the glass plate.

10. The method according to claim 9, further comprising doping the membrane with phosphoric acid.

11. A membrane produced according to claim 10.

12. A method for preparing a solution of sulfonated polymer and a phosphonic acid, comprising:

dissolving the sulfonated polymer in an aprotic solvent; and adding the phosphonic acid into the solution, wherein a ratio of the phosphonic acid molecule to the sulfonic acid groups in the sulfonated polymer is 1:2, and wherein the phosphonic acid comprises more than one basic center that accepts a proton.

* * * * *